UNITED STATES PATENT OFFICE.

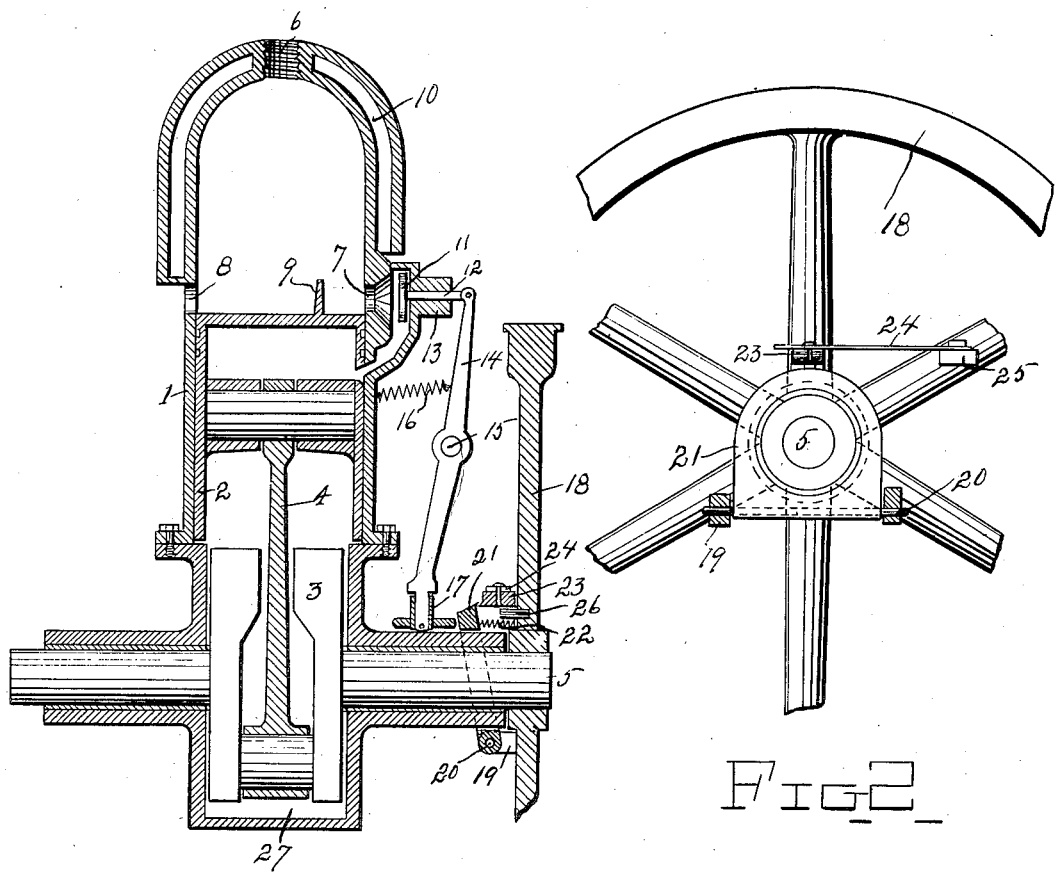

HORACE E. WOOLERY, OF FAIRMONT, MINNESOTA, ASSIGNOR TO FAIRMONT MACHINE COMPANY, OF FAIRMONT, MINNESOTA, A CORPORATION OF MINNESOTA.

GOVERNOR FOR EXPLOSIVE-ENGINES.

937,743.  Specification of Letters Patent.  Patented Oct. 19, 1909.

Application filed November 9, 1908. Serial No. 461,781.

*To all whom it may concern:*

Be it known that I, HORACE E. WOOLERY, citizen of the United States of America, residing at Fairmont, in the county of Martin and State of Minnesota, have invented certain new and useful Improvements in Governors for Explosive-Engines, of which the following is a specification.

This invention relates to new and useful improvements in governors and has relation more particularly to governors employed in conjunction with explosive engines.

It is an object of the invention to provide a novel device of this character wherein the charge admission port is controlled by the fly wheel.

It is also an object of the invention to provide a novel governor carried by the fly wheel for controlling the charge admissions.

It is also an object of the invention to produce a novel device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view partly in section and partly in elevation illustrating the invention; Fig. 2, is a view partly in elevation and partly in section of a fragment of the fly wheel illustrating a detail of the invention.

In the drawings 1, denotes the cylinder having therein the piston 2, which is suitably connected with the crank 3, by the rod 4, for rotating the shaft 5. The cylinder is provided with the holes 6, for the sparking plug and the intake port 7, and exhaust port 8, all of which being of any ordinary or desired construction, attention is directed however to the fact that the piston is provided with a deflector 9, said deflector being in proximity to the intake port 7. The cylinder 1, or the end thereof constituting the explosion chamber is provided with the jacket 10.

The intake port is controlled by the valve 11, provided with a stem 12, passing through a bushing 13, of the cylinder. The outer end of the stem 12, is secured to a lever 14, pivoted intermediate its length as at 15, to any suitable support. In order that the valve 11, may normally close the intake port 7, a spring 16, is interposed between the wall of the cylinder and the lever 14 above its pivot, said spring being a contraction spring and thereby as is believed to be obvious causes the valve to close the port 7. The lower or opposite end of the lever 14, is reduced and on this reduced portion is mounted a roller 17, for a purpose to be hereinafter referred to.

Fixed to the shaft 5, is a fly wheel 18. Carried by the fly wheel 18, are alining lugs 19, in which is mounted a rod or shaft 20. This shaft has fixed thereon a plate 21, having a perforation or opening to enable it to pass over the shaft 5, or its bushing.

Secured to the plate 21, adjacent its free edge or the edge opposite to the shaft 20, and to the fly wheel 18, is a compression spring 22. This spring is intended to normally push the plate 21, toward the roller 17. It is the intention of the invention that the free portion of this plate be held in such position as to contact with the roller 17, of the lever 14, and move the lever 14, in order to open the intake port at the proper time. After the plate has passed the roller 17, the spring 16, will cause the lever 14, to close the port. In order to hold the plate in this position, a block 23, is positioned between the free edge of the plate 21, and the fly wheel. This block is secured to a spring arm 24, fixed at one end to a lug 25, carried by the fly wheel. Under normal conditions the block 23, will rest on a stop 26, carried by the fly wheel and hold the plate 21, in the desired position, but should the speed of the engine become too great the centrifugal force will cause the block 23, to rise from between the plate 21, and the fly wheel. This will permit the spring 16, to overcome the pressure of the spring 22, and the valve will close and remain closed, since the plate 21, will be pushed toward the wheel 18, at each rotation, so long as the block 23, is out of the path of travel of the end of the plate 21, and this will prevent the admission of any explosive charges until the engine has returned to its normal speed, when the weight of the block and its spring will cause it to return to its proper position, between the plate 21, and the fly wheel 18. In order to effect the proper engagement of the block 23, and the plate 21, the engaging or contacting edges of the same are each formed with a knife edge as is believed to be fully shown in Fig. 1.

From the foregoing description, it is thought that the operation of the device is fully apparent although it might be well to further state that the explosive charge is admitted within the explosion chamber through the intake port 7, from the crank case 27, through the port 28.

I claim:

1. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, means carried by the fly wheel contacting with the lever for imparting movement to the valve in one direction, and means for imparting movement to the valve in an opposite direction.

2. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, and a plate carried by the fly wheel contacting with the lever for imparting movement to the valve in one direction.

3. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, and a plate pivoted to the fly wheel contacting with the lever for imparting movement to the valve in one direction.

4. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate pivoted to the fly wheel contacting with the lever for imparting movement to the valve in one direction, and movable means carried by the fly wheel for holding the plate in proper position for contacting with the lever.

5. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate pivoted to the fly wheel contacting with the lever for imparting movement to the valve in one direction, movable means carried by the fly wheel for holding the plate in proper position for contact with the lever, and means for limiting the movement of the movable means in one direction.

6. In combination, a cylinder having an explosive chamber, a piston within the cylinder, said cylinder having an intake port, a shaft rotated by the piston, a fly wheel pivoted intermediate its length, one end of said lever being connected with the valve, a plate pivoted to the fly wheel contacting with the lever for imparting movement to the valve in one direction, movable means carried by the fly wheel for holding the plate in proper position for contacting with the lever, and a stop carried by the fly wheel for limiting the movement of the movable means.

7. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate carried by the fly wheel, and means interposed between the plate and fly wheel for causing the plate to contact with the lever for moving the same on its pivot.

8. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate carried by the fly wheel, and movable means interposed between the plate and fly wheel for causing the plate to contact with the lever for moving the same on its pivot.

9. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate carried by the fly wheel, movable means interposed between the plate and fly wheel for causing the plate to contact with the lever for moving the same on its pivot, and means for holding the plate in contact with the movable means.

10. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate pivotally carried by the fly wheel and contacting with the lever to permit movement of the same, a spring arm carried by the fly wheel, a block carried by the spring arm, said block normally resting between the plate and the fly wheel.

11. In combination, a cylinder having an explosive chamber, a piston within the cylinder, said cylinder having an intake port, a shaft rotated by the piston, a fly wheel carried by the shaft, a valve for the intake port, a lever pivoted intermediate its length, one end of said lever being connected with the valve, a plate pivotally carried by the fly wheel, and contacting with the lever to permit movement of the same, a spring arm carried by the fly wheel, a block carried by the spring arm, said block normally resting between the plate and the fly wheel, the contacting edges of the block and plate being knife edges.

In testimony whereof, I affix my signature in the presence of two witnesses.

HORACE E. WOOLERY.

Witnesses:
J. E. PALMER,
R. W. PALMER.